(12) United States Patent
Hassan et al.

(10) Patent No.: US 10,649,146 B2
(45) Date of Patent: May 12, 2020

(54) OPTICAL COUPLING DEVICE

(71) Applicant: COMMISSARIAT A L'ENERGIE ATOMIQUE ET AUX ENERGIES ALTERNATIVES, Paris (FR)

(72) Inventors: Karim Hassan, Moneteau (FR); Salim Boutami, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/331,901

(22) PCT Filed: Sep. 12, 2017

(86) PCT No.: PCT/FR2017/052412
§ 371 (c)(1),
(2) Date: Mar. 8, 2019

(87) PCT Pub. No.: WO2018/051001
PCT Pub. Date: Mar. 22, 2018

(65) Prior Publication Data
US 2019/0196109 A1    Jun. 27, 2019

(30) Foreign Application Priority Data

Sep. 15, 2016    (FR) ...................... 16 58627

(51) Int. Cl.
*G02B 6/30* (2006.01)
*G02B 6/34* (2006.01)
(Continued)

(52) U.S. Cl.
CPC ............... *G02B 6/30* (2013.01); *G02B 6/124* (2013.01); *G02B 6/34* (2013.01); *G02B 2006/12102* (2013.01); *G02B 2006/12107* (2013.01)

(58) Field of Classification Search
None
See application file for complete search history.

(56) References Cited

U.S. PATENT DOCUMENTS

| 5,317,551 A | 5/1994 | Shiono |
| 7,184,627 B1 | 2/2007 | Gunn, III et al. |
| (Continued) | | |

FOREIGN PATENT DOCUMENTS

EP    2 977 801 A1    1/2016

OTHER PUBLICATIONS

International Search Report dated Dec. 15, 2017 in PCT/FR2017/052412 filed on Sep. 12, 2017.
(Continued)

*Primary Examiner* — John Bedtelyon
(74) *Attorney, Agent, or Firm* — Oblon, McClelland, Maier & Neustadt, L.L.P.

(57) ABSTRACT

An optical coupling device including, in sequence, a focusing lens and an optical coupling network, the coupling device being symmetric with respect to a plane, the focusing lens formed in a core layer, as a front face, perpendicular to the plane, the optical coupling network including a plurality of trenches, formed on the front face, and convex in shape, the optical coupling network including, in sequence, a first sub-network and a contiguous second sub-network, respectively delimited, by a first contour and a second contour, the first and second contours extending in a divergent manner and convergent manner respectively.

10 Claims, 6 Drawing Sheets

(51) Int. Cl.
*G02B 6/124* (2006.01)
*G02B 6/12* (2006.01)

(56) References Cited

U.S. PATENT DOCUMENTS

| | | | | |
|---|---|---|---|---|
| 7,609,920 | B2* | 10/2009 | Kim | B82Y 20/00 |
| | | | | 385/15 |
| 10,180,523 | B2* | 1/2019 | Koch | G02B 6/30 |
| 2004/0156589 | A1 | 8/2004 | Gunn, III et al. | |
| 2009/0087141 | A1 | 4/2009 | Kim et al. | |
| 2014/0010498 | A1 | 1/2014 | Verslegers et al. | |
| 2016/0025931 | A1 | 1/2016 | Bogaerts | |

OTHER PUBLICATIONS

French Preliminary Search Report dated May 31, 2017 in French Application 16 58627 filed on Sep. 15, 2016.

Taillaert, D. et al., "Compact efficient broadband grating coupler for silicon-on-insulator waveguides," Optics Letters, vol. 29, No. 23, Dec. 2004, pp. 2749-2751.

Vermeulen, D. et al., "High-efficiency fiber-to-chip grating couplers realized using an advanced CMOS-compatible Silicon-On-Insulator platform," Optics Express, vol. 18, No. 17, Aug. 2010, pp. 18278-18283.

Li, C. et al., "CMOS-compatible high efficiency double-etched apodized waveguide grating coupler," Optics Express, vol. 21, No. 7, Apr. 2013, pp. 7868-7874.

Van Acoleyen, K. et al., "Compact lens-assisted focusing tapers fabricated on Silicon-On-Insulator," IEEE, 2011, pp. 157-159.

Ding, Y. et al., "Fully etched apodized grating coupler on the SOI platform with -0.58 dB coupling efficiency," Optics Letters, vol. 39, No. 18, Sep. 2014, pp. 5348-5350.

Hirata, T. et al., "Demonstration of a Waveguide Lens Monolithically Integrated with a Laser Diode by Compositional Disordering of a Quantum Well," IEEE Photonics Technology Letters, vol. 5, No. 6, Jun. 1993, pp. 698-700.

* cited by examiner

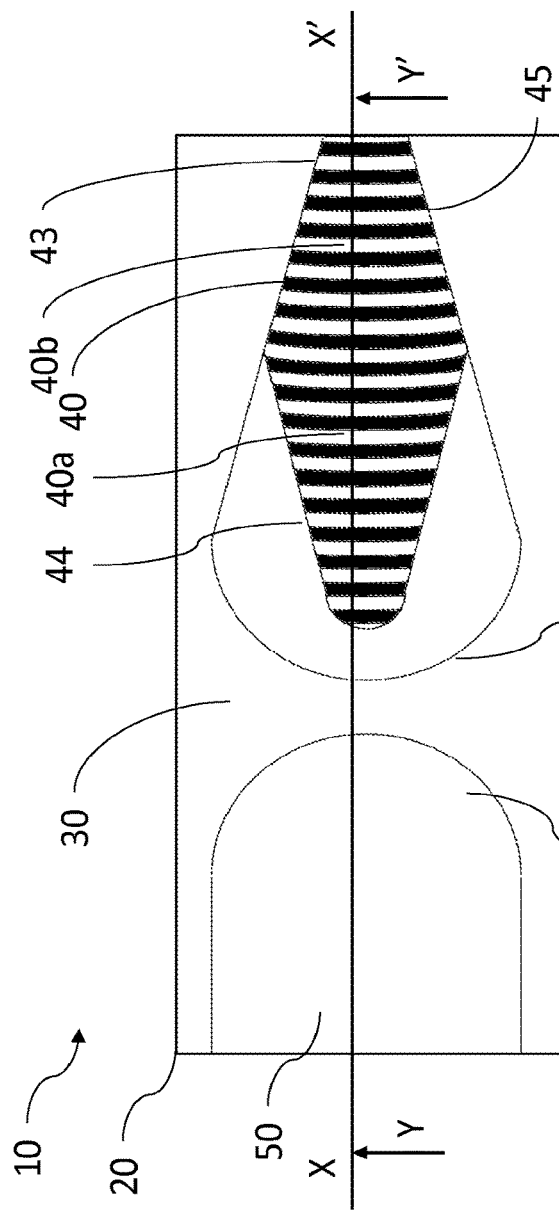
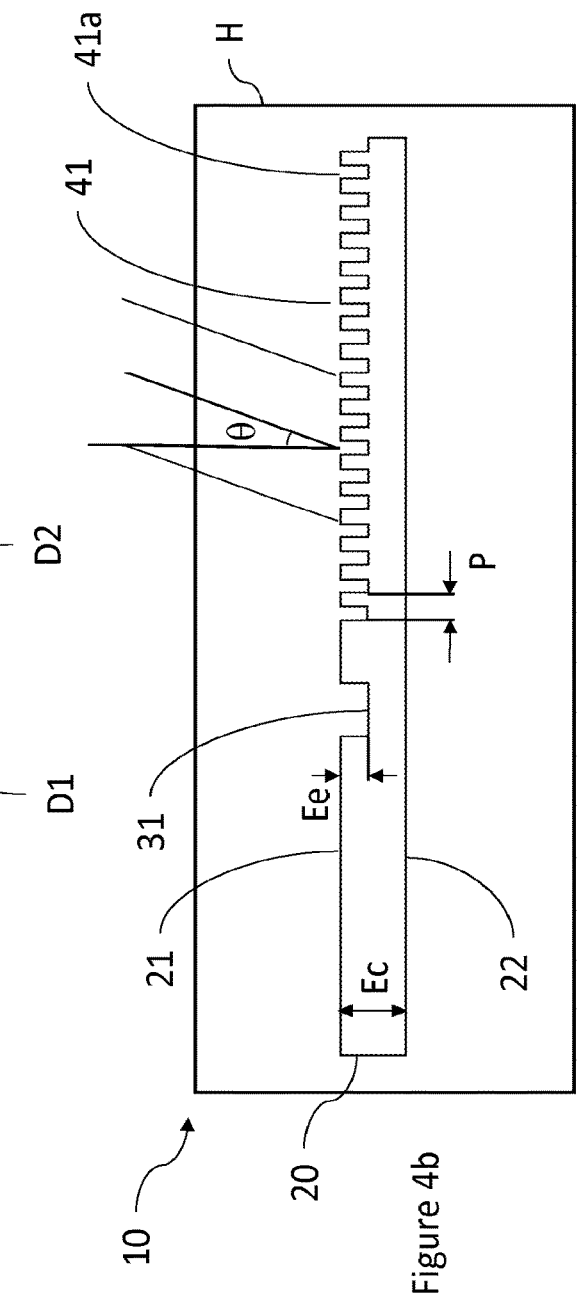
Figure 4a
Figure 4b

OPTICAL COUPLING DEVICE

TECHNICAL FIELD

The present invention relates to an optical coupling device comprising a focusing lens and an optical grating coupler for optically coupling optical devices, for example, photonic devices. More particularly, the present invention relates to an optical coupling device comprising a diffraction grating coupler for providing a light radiation, emitted by said grating, with a Gaussian envelop.

Prior Art

FIG. 1 shows an optical coupling device 1, comprising a waveguide 2 and an optical grating coupler 3, known in the state of the art and described in FIG. 1 of document [1] cited at the end of the description. The optical coupling device 1 comprises:
- a waveguide 2 comprising a core formed in a core layer 4 with a thickness Ec, the core layer 4 comprising a face, called a front face 5, the waveguide being intended to guide a radiation with a wavelength λ, and along a direction XX' parallel to the front face;
- a grating coupler 3 comprising a plurality of trenches 6 formed on the front face 5, with a depth Et lower than the thickness Ec, and which are periodically disposed along the direction XX'.

This type of device is generally used to optically couple the waveguide with another optical device such as an optical fibre.

FIG. 2 illustrates an example of coupling of an optical fibre 7 with the waveguide 2 of the optical device. The optical fibre 7 is disposed in parallel to a plane H perpendicular to the front face 5, and comprising the direction XX'. The optical fibre 7 has also an angle θ with respect to the normal direction ZZ' to the optical grating coupler 3. The angle θ also corresponds to an angle of emission of the optical grating coupler 3. More particularly, the end of the optical fibre is disposed above the grating coupler 3, such that a light radiation from the waveguide 2 is at least partly injected into the optical fibre 7 via the optical grating coupler.

It is however observed in this configuration that the optical coupling between the optical coupling device 1 and the optical fibre 7 offers a limited efficiency.

In order to inject an optimum amount of light radiation into the optical fibre, it is desirable that the said light radiation emitted by the grating coupler has a Gaussian profile.

But, as illustrated in FIG. 3, an exponential decay, along the direction XX', of the light intensity (represented in the vertical axis as a function of a position on the grating along the direction XX' on the horizontal axis) emitted by the optical grating coupler is clearly observed.

To overcome this problem, documents [1], [2], [3] suggest to adapt the structure of the optical grating coupler, in particular by apodising said grating, so as to improve coupling. The gains in terms of efficiency remain reduced however, and the exponential decay, along the direction XX', of the light intensity emitted by the optical grating coupler is still observed.

Documents [6], [7], and [8] cited at the end of the description each describe an optical coupling device.

Document [9] discloses an optical pick-up head of an optical disc.

One purpose of the present invention is thereby to provide an optical coupling device having an optical coupling efficiency higher than that of the optical coupling devices known in the state of the art.

Another purpose of the present invention is to provide an optical coupling device for which the envelop of the light radiation emitted by the optical grating coupler is essentially Gaussian.

DISCLOSURE OF THE INVENTION

The purposes of the invention are at least partly achieved by an optical coupling device, for coupling a waveguide with an optical fibre, the optical coupling device comprising in sequence, along a direction XX', a focusing lens and an optical grating coupler, the optical coupling device being symmetrical with respect to a plane H, and wherein:
- the focusing lens is formed in a core layer having a refractive index nc and a thickness Ec, and comprising two faces, respectively called a front face and a rear face, which are essentially parallel, and in contact with media with refractive indices lower than the refractive index nc, the plane H is perpendicular to the core layer, and its intersection with the core layer comprises the direction XX', the focusing lens is for focusing a light radiation, propagating along the direction XX', at a focusing point F,
- the optical grating coupler comprises a plurality of trenches, formed on the front face, parallel to each other, and with a convex shape along the direction XX', the optical grating coupler comprises, in sequence, along the direction XX', a first sub-grating and a second sub-grating, which are contiguous, delimited, respectively, by a first contour and a second contour, said first and second contours extend, along the direction XX', respectively, in a divergent way and in a convergent way, the focusing point F is included in the optical grating coupler.

According to one embodiment, the focusing lens comprises in sequence, along the direction XX', a first dioptre D1 and a second dioptre D2, delimiting a recess in the core layer with a depth Ee lower than or equal to the thickness Ec.

According to one embodiment, the focusing lens is a concave-concave lens.

According to one embodiment, the first dioptre D1 and the second dioptre D2 each have, along a plane parallel to the front face, an arc-of-circle cross-section.

According to one embodiment, the first contour comprises in sequence, along the direction XX', a first central contour disposed between two first side contours, the first two side contours being symmetrically disposed with respect to the plane H, and as an extension of the central contour, the first two side contours being planar.

According to one embodiment, the first central contour has a conical cross-section along a plane parallel to the front face, advantageously, the conical cross-section is a semi-circle.

According to one embodiment, the conical cross-section is a semi-circle.

According to one embodiment, the conical cross-section comprises a focus in register with the focusing point F.

According to one embodiment, the second contour comprises two planar parts disposed as an extension of the first contour, and symmetrically with respect to the plane H.

According to one embodiment, the second contour comprises a second planar contour, perpendicular to the direction XX', and connecting both planar parts.

According to one embodiment, the trenches of the plurality of trenches are disposed periodically according to a period P, the period P being defined by the relationship:

$$\lambda = P(\text{neff} - nc \cdot \sin(\theta))$$

where neff is an effective refractive index of an optical mode guided from the focusing lens to the optical grating coupler, and θ an angle, along a direction of the plane H, of emission from the grating coupler.

BRIEF DESCRIPTION OF THE DRAWINGS

Further characteristics and advantages will appear in the description that follows of the optical coupling device according to the invention, given by way of non-limiting examples, in reference to the appended drawings in which:

FIGS. 4a and 4b are schematic representations of the optical coupling device according to one embodiment of the invention, respectively, in top view (through the front face), and in a transverse cross-section (along the cross-section plane YY')

DETAILED DISCLOSURE OF PARTICULAR EMBODIMENTS

Figure 1:
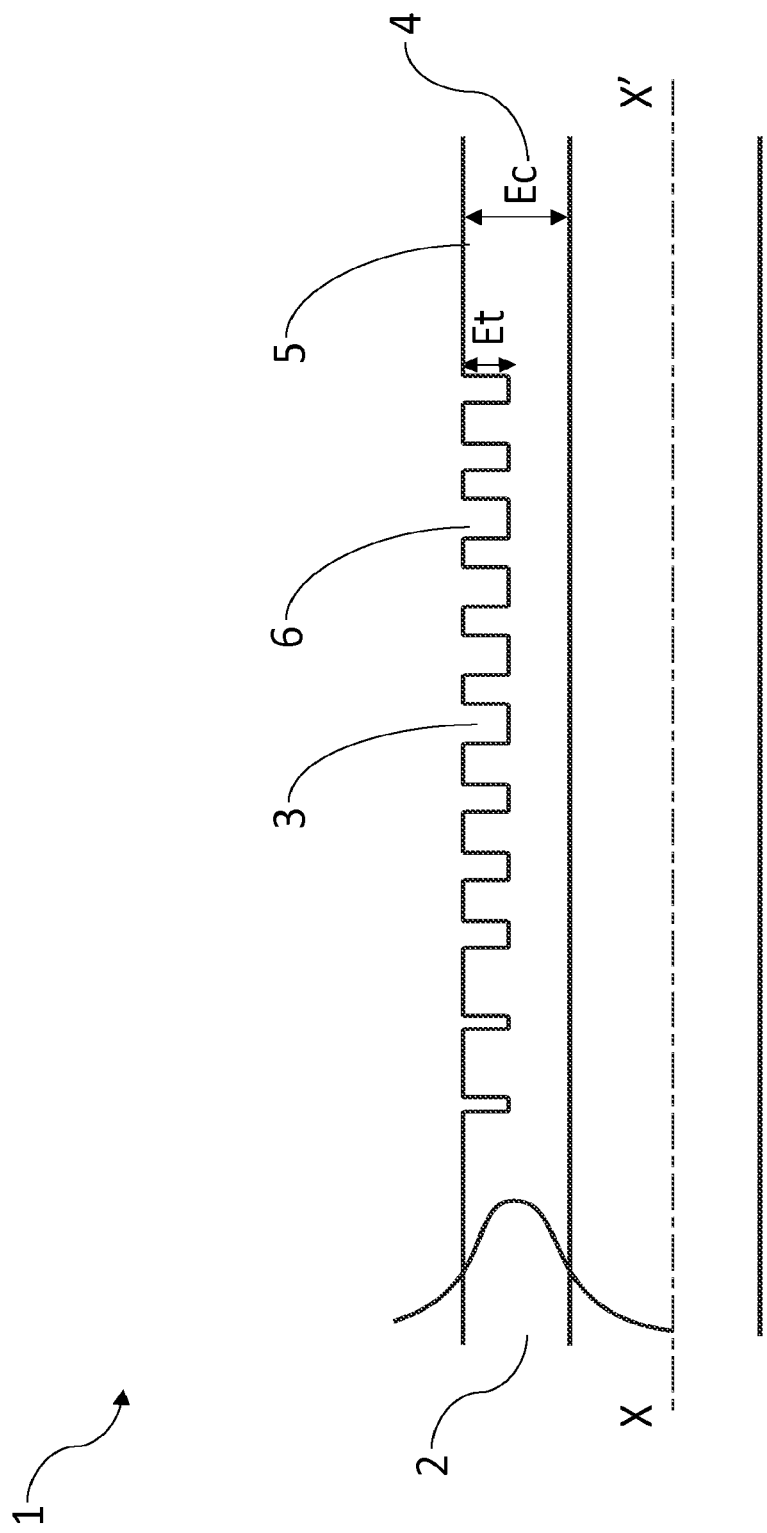
FIG. 1 is a schematic representation, along a transverse cross-section plane, of an optical coupling device known in the state of the art.
Figure 2:
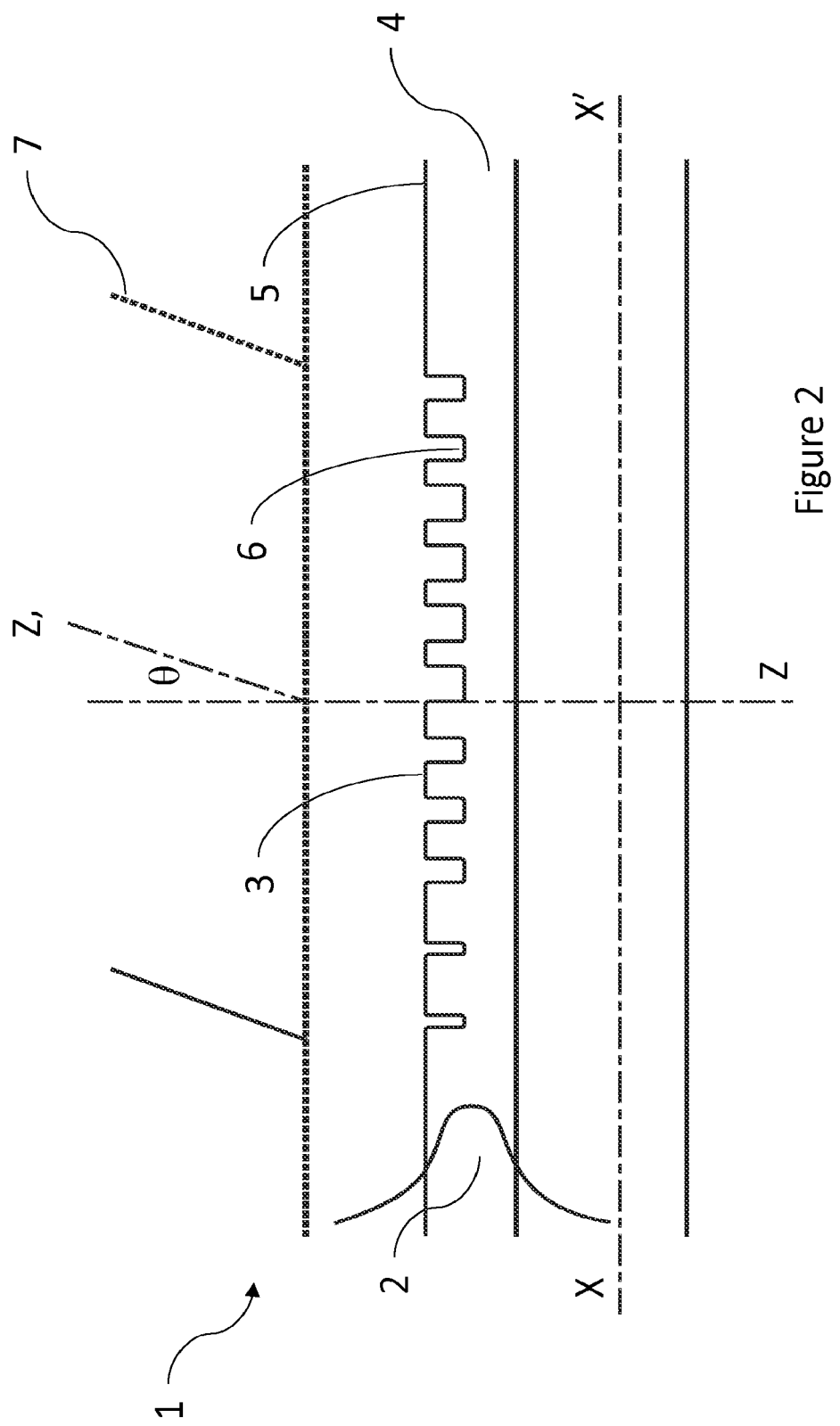
FIG. 2 is a schematic representation, along a transverse cross-section plane, of an optical coupling device coupled to an optical fibre, and known in the state of the art.
Figure 3:
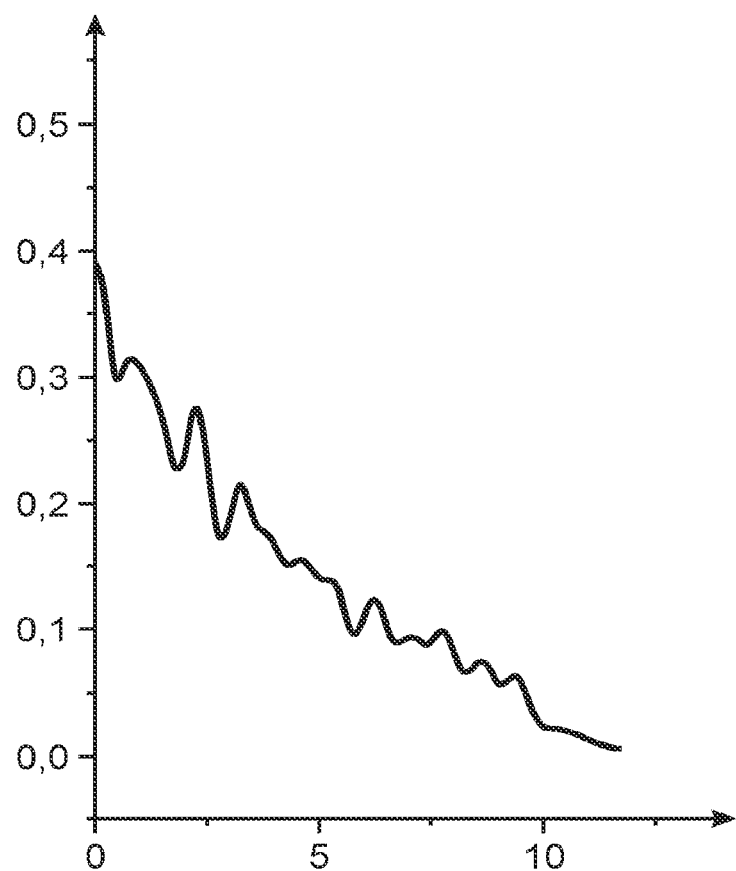
FIG. 3 is a graph representing the intensity (along the vertical axis) of the light radiation emitted by an optical grating coupler known in the state of the art, as a function of a position on said grating along the axis XX' (along the horizontal axis)

The invention described in a detailed manner below implements an optical coupling device allowing an efficient coupling to an optical fibre. More precisely, the present invention implements an optical coupling device provided with an optical grating coupler comprising a first sub-grating and a second sub-grating, the respective contours (a first contour and a second contour) of which extend in a divergent way and in a convergent way respectively along the direction of elongation XX' of the optical grating coupler. The device according to the invention further comprises a focusing lens able to focus a light radiation, propagating along the direction XX', at a focusing point F included in the first sub-grating. The first sub-grating, with its first divergent contour, enables a light radiation having a Gaussian profile to be obtained along the longitudinal (along the direction XX') and transverse (perpendicular to the direction XX') directions.

In FIGS. 4a and 4b, a schematic representation of the optical coupling device 10 according to the invention can be seen.

The optical coupling device 10 comprises in sequence, along a direction XX', a focusing lens 30 and an optical grating coupler 40.

The optical coupling device 10 is formed on or in a core layer 20.

The optical coupling device 10 is symmetrical with respect to a plane H perpendicular to the core layer 20, and the intersection of which with said core layer 20 comprises the direction XX'.

It is intended that all the elements, or sub-elements, of the optical coupling device 10, cited in the description, are symmetrical with respect to the plane H.

The optical coupling device 10 is for example for coupling a waveguide with an optical fibre. More particularly, the optical coupling device 10 is adapted to transmit a light radiation with a wavelength λ, from the waveguide to the optical fibre. In practice, the optical fibre is disposed above the optical grating coupler, either perpendicularly (otherwise in normal incidence), or obliquely in the plane H. The angle of incidence is noted θ (in degrees "°") of the optical fibre with respect to the normal of the optical grating coupler 10.

More particularly, the optical grating coupler 40 emits the light radiation along a preferential direction. In the description, it will be considered that the optical fibre is coupled to the optical coupling device 10 according to this angle of emission and said angle of emission will be assumed to be the angle θ. In this regard, it is noted that the angle of emission corresponds to a direction included in the plane H.

The core layer 20 has a thickness Ec, and is made of a material with a refractive index nc.

It is intended, without being necessary to set it out, that the core layer 20 is a layer for confining a quasi-monochromatic light radiation with a wavelength λ, likely to be guided by the optical coupling device 10.

More particularly, the core layer 20 comprises two faces, respectively a front face 21 and a rear face 22, being essentially parallel, and in contact with media with refractive indices lower than the refractive index nc.

By quasi-monochromatic light radiation, it will be meant a light radiation comprising a band with a spectral range $\Delta\lambda < \lambda/10$ centred on a central wavelength λ.

Advantageously, the light radiation can be monochromatic with a wavelength λ (in this case, the central wavelength λ will be assumed to be the wavelength λ, of the monochromatic radiation).

Advantageously, the central wavelength λ, can be between 1 260 nm and 1 360 nm, for example 1 310 nm, or between 1 530 nm and 1 580 nm, for example 1 550 nm.

The core layer 20 can comprise at least one of the materials chosen from: silicon, silicon nitride (SiNx), titanium dioxide, germanium, . . . .

The core layer 20 can for example be a semiconductor layer of a semiconductor-on-insulator substrate, for example silicon-on-insulator.

The focusing lens 30 is formed in the core layer 20.

The focusing lens 30 is intended to focus a light radiation with a wavelength λ, propagating along the direction XX', at a focusing point F at the optical grating coupler 40. Thus, the light radiation propagates from the focusing lens 30 towards the focusing point F according to a curved wave front. More precisely, said wave front has a first convex curvature along the direction XX'.

The first curvature of the wave front depends on the geometrical parameters of the lens and can thus be adjusted by techniques known to those skilled in the art.

By convex along the direction XX', it is meant a convexity oriented along the axis XX'. More particularly, a convex element along the direction XX' has a curvature in the plane of the front face 21, said curvature having a convexity oriented along the axis XX'.

By concave along the direction XX', it is meant a concavity oriented along the axis XX'. More particularly, a concave element along the direction XX' has a curvature in the plane of the front face 21, said curvature having a concavity oriented along the axis XX'.

Upon reading what precedes, it is obvious that the focusing lens 30 is a convergent lens.

For that purpose, the focusing lens 30 can comprise in sequence, along the direction XX', a first dioptre D1 and a second dioptre D2, delimiting a recess 31 in the core layer 20 with a depth Ee lower than the thickness Ec. The depth Ee is for example lower than or equal to half the thickness Ec.

By recess, it is meant a material removal in the core layer 20, for example from the front face 21.

The recess can for example be obtained by etching a silicon layer following a photolithography step. These techniques, known to those skilled in the art, are not described in further detail in the present invention.

The first dioptre D1 and the second dioptre D2 can each have their surface perpendicular to the core layer 20.

The first dioptre D1 and the second dioptre D2 can be, along the direction XX', of a concave shape and of convex shape respectively.

The focusing lens 30 is thereby a concave-concave lens.

Advantageously, the first dioptre D1 and the second dioptre D2 can each have, along a plane parallel to the front face 21, an arc of circle cross-section (for example a semi-circle), with respective radiuses R1 and R2.

Those skilled in the art will find in document [5] cited at the end of the description information necessary for designing the focusing lens comprising a first D1 and a second D2 dioptre.

Particularly advantageously, the dioptre D1 terminates a waveguide 50 formed in the core layer 20, extending along the direction XX'.

The waveguide 50 is adapted to guide an optical mode associated with the light radiation with an effective refractive index neff.

Thereby, any light radiation guided by the waveguide 50, is focused by the focusing lens 30 at the focal point F disposed at the optical grating coupler 40.

The optical grating coupler 40 comprises a plurality of trenches 41, formed in the core layer 20 from the front face 21, for example with a depth Ee.

By optical grating coupler 40, it is meant a diffraction grating comprising trenches periodically disposed according to a period P.

The trenches 41a of the plurality of trenches 41 are parallel to each other. On the other hand, the trenches 41a are of a convex shape along the direction XX'. The trenches 41a are thus curved, and have a second curvature.

The period P can satisfy the following relationship:

$$m\lambda = P(neff - nc^* \sin(\theta)) \text{ (} m \text{ being a positive integer, for example } m=1\text{).}$$

Advantageously, the second curvature of the trenches 41a is close to the first curvature. By close, it is meant that a deviation not exceeding 15% can be accepted. The first and second curvatures are further advantageously identical. Thus, the front wave of the light radiation, focused by the focusing lens 30, is matched with the second curvature of the trenches 41a of the optical grating coupler 40.

The optical grating coupler 40 is also delimited by a contour 43. By contour, it is intended an exposed side surface which is essentially perpendicular to the front face 21. It is intended, without being necessary to set it out, that the contour 43 is a closed surface.

The optical grating coupler 40 comprises a first sub-grating 40a, and a second sub-grating 40b. The first sub-grating 40a and the second sub-grating 40b are contiguous, and disposed in sequence along the direction XX'.

The contour 43 comprises, in sequence, along the direction XX', a first contour 44 and a second contour 45 extending, still along the direction XX', in a divergent way and in a convergent way.

The first contour 44 delimits the first sub-grating 40a.

The second contour 45 delimits the second sub-grating 40b.

It is intended that the first 44 and second 45 contours are not closed, and that the contour common to the first 40a and second 40b sub-gratings is delimited by none of the first 44 and second 45 contours. In other words, the first contour 44 delimits the first sub-grating 40a on its perimeter not common with that of the second sub-grating 40b, and the second contour 45 delimits the second sub-grating 40b on its perimeter not common with that of the first sub-grating 44.

Figure 6:
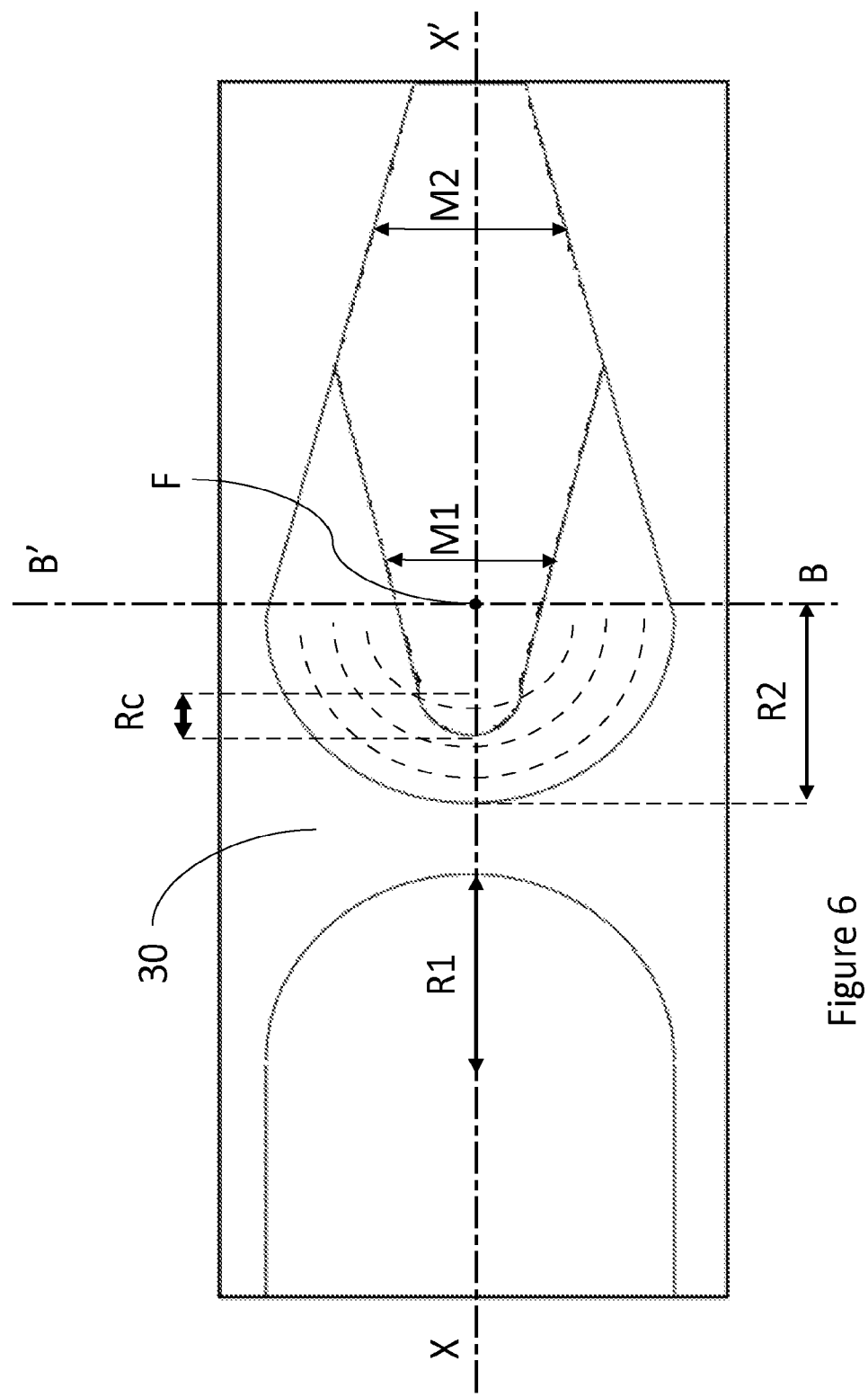
FIG. 6 is a schematic representation illustrating the divergence and convergence of the first contour and of the second contour, respectively.

By extending in a divergent way, it is meant a gradual increase, along the direction XX', in the distance M1 between the walls of the first contour, the distance M1 being measured along a direction BB' perpendicular to the plane H (FIG. 6).

The gradual increase can be, for example, at least partly linear.

By extending in a convergent way, it is meant a gradual decrease, along the direction XX', in the distance M2 between the walls of the second contour, the distance M2 being measured along a direction BB' perpendicular to the plane H (FIG. 6).

Particularly advantageously, the focusing point F is included at the first sub-grating 40a, for example close to its centre.

The focusing point F can also be included at the second sub-grating 40b.

Thus, the divergent profile of the first contour 44 enables a Gaussian envelop of the light radiation emitted by the optical grating coupler 40 to be obtained, making coupling with an optical fibre more efficient.

Figure 5:
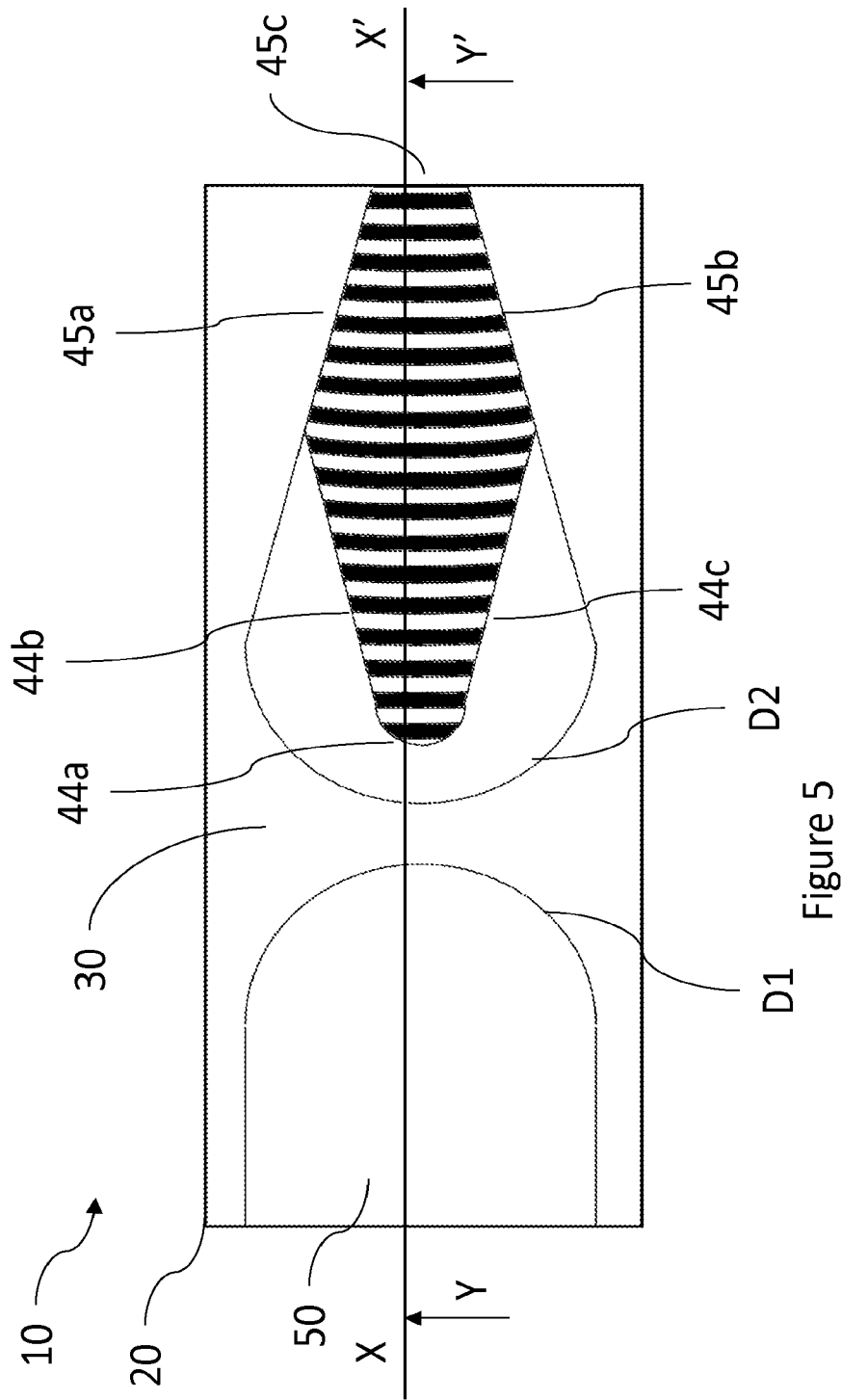
FIG. 5 is a schematic representation in a top view of the optical coupling device according to the invention, detailing the elements of the focusing lens and of the contour of the optical grating coupler according to the invention.

Advantageously, the first contour 44 comprises in sequence, along the direction XX', a first central contour 44a and two first side contours 44b and 44c (FIG. 5). The first two side contours 44b and 44c are disposed symmetrically with respect to the plane H, and as an extension of the first central contour 44a. Further, the first two side contours 44b and 44c are planar.

The first central contour 44a can exhibit a conical cross-section along a plane parallel to the front face.

Advantageously, the conical cross-section can be a semi-circle.

The second contour 45 can comprise two planar parts 45a and 45b (FIG. 5) disposed as an extension of the first contour 44, and symmetrically with respect to the plane H (by planar part, it is meant a planar surface perpendicular to the front face 21).

The second contour 45 can comprise a second planar contour 45c, perpendicular to the direction XX', and connecting both planar parts 45a and 45b.

The optical grating coupler 40 can also be apodised.

For example, the first four trenches 41a (along the direction XX') of the grating coupler 40 can have a width, respectively, of 100 nm, 120 nm, 160 nm and 180 nm. The next trenches can have a width of 247.5 nm.

In order to estimate the performance thereof, the behaviour of the optical coupling device 10 according to the invention has been simulated according to a so-called FDTD ("Finite Difference Time Domain Method") digital model.

In this example, the focusing lens 30 comprises the first D1 and second D2 dioptres, each having a cross-section, along a plane parallel to the core layer 20, as a semi-circle with a radius R=15 µm. The device further comprises a waveguide 50 extending along the direction XX' and terminating with the first dioptre D1. Still in this example, the first contour comprises the first central contour 44a and the first two side contours 44b and 44c. The first central contour 44a has along the plane parallel to the front face 21, a cross-section as a semi-circle, with a radius Rc=8.2 µm.

The first two side contours 44b and 44c extend over a length of 2.2 µm in the plane of the core layer 20, with respect to the direction XX'.

Both side contours 44b and 44c have a deflection, respectively, of 6.2 µm with respect to the direction BB'.

The wavelength of the light radiation considered is 1310 nm, the periodicity of the optical grating coupler is P=495 nm.

The angle of emission θ, in this configuration, is 6° (it is noted that for an optical grating coupler known in the state of the art, the angle of emission is generally 8°).

In the absence of a mirror under the optical grating coupler 10, a decoupling higher than 50% is observed.

The applicant has thus observed along the longitudinal direction (along the axis XX') of the optical coupling device 10 an emission of a light radiation having an essentially Gaussian profile.

The radiation emitted by the optical grating coupler 10 is thus adapted to be efficiently injected in an optical fibre with a circular cross-section.

The optical coupling efficiency with the optical coupling device 10 according to the invention is thus optimised insofar as said device is coupled with an optical fibre (with a circular cross-section).

REFERENCES

[1] D. Taillaert et al., "Compact efficient broadband grating coupler for silicon-on-insulator waveguides", Opt. Lett. 29(23), 2749 (2004),
[2] D. Vermeulen et al., "High-efficiency fiber-to-chip grating coupler realized using an advanced CMOS-compatible Silicon-On-Insulator platform", Opt. Lett., 18(17), 18278 (2010),
[3] Chao Li et al., "CMOS-compatible high efficiency double-etched apodized waveguide grating coupler", Opt. Express, 21(7), 7868 (2013),
[4] Katsunari Okamoto, "Fundamentals of optical waveguides", ISBN: 978-0-12-525096-2,
[5] K. Van Acoleyen et al., «Compact lens-assisted focusing tapers fabricated on silicon-on-insulator», IV Photonics (GFP), 2001, 8th IEEE, pp. 7-9 (2011),
[6] US2009/0087141,
[7] U.S. Pat. No. 7,184,627,
[8] Hirata et al., "Demonstration of a Wave Guide Lens Monolithically Integrated with a Laser Diode by Composition Disordering of a Quantum Well", IEEE Photonics Technology Letters, 5(6), 1041-1135, (1993),
[9] EP2977801.

The invention claimed is:

1. An optical coupling device for coupling a waveguide with an optical fiber, the optical coupling device comprising in sequence, along a direction XX':
a focusing lens and an optical grating coupler, the optical coupling device being symmetrical with respect to a plane H; and wherein:
the focusing lens is formed in a core layer having a refractive index nc and a thickness Ec, and comprising two faces, respectively as a front face and a rear face, which are essentially parallel, and in contact with media with refractive indices lower than the refractive index nc, the plane H is perpendicular to the core layer, and its intersection with the core layer comprises the direction XX', the focusing lens is for focusing a light radiation, propagating along the direction XX', at a focusing point F;
the optical grating coupler comprises a plurality of trenches, formed on the front face, parallel to each other, and with a convex shape along the direction XX',
the optical grating coupler comprises, in sequence, along the direction XX', a first sub-grating and a second sub-grating, which are contiguous, delimited, respectively, by a first contour and a second contour, the first and second contours extend, along the direction XX', respectively, in a divergent way and in a convergent way, the focusing point F is included in the optical grating coupler.

2. The optical coupling device according to claim 1, wherein the focusing lens comprises in sequence, along the direction XX', a first diopter and a second dioptre, delimiting a recess in the core layer with a depth Ee lower than or equal to the thickness Ec.

3. The optical coupling device according to claim 2, wherein the focusing lens is a concave-concave lens.

4. The optical coupling device according to claim 2, wherein the first dioptre and the second dioptre each have, along a plane parallel to the front face, an arc-of-circle cross-section.

5. The optical coupling device according to claim 1, wherein the first contour comprises in sequence, along the direction XX', a first central contour disposed between two first side contours, the first two side contours being symmetrically disposed with respect to the plane H, and as an extension of the central contour, the first two side contours being planar.

6. The optical coupling device according to claim 5, wherein the first central contour has a conical cross-section along a plane parallel to the front face.

7. The optical coupling device according to claim 6, wherein the conical cross-section is a semi-circle.

8. The optical coupling device according to claim 1, wherein the second contour comprises two planar parts disposed as an extension of the first contour, and symmetrically with respect to the plane H.

9. The optical coupling device according to claim 8, wherein the second contour comprises a second planar contour, perpendicular to the direction XX', and connecting both planar parts.

10. The optical coupling device according to claim 1, wherein the trenches of the plurality of trenches are disposed periodically according to a period P, the period P being defined by relationship:

$$=P(\text{neff}-nc^*\sin(\theta))$$

wherein neff is an effective refractive index of an optical mode guided from the focusing lens to the optical grating coupler, and θ an angle, along a direction of the plane H, of emission from the grating coupler.

* * * * *